(No Model.)

C. W. MAY.
CHECK ROW CORN PLANTER.

No. 437,220. Patented Sept. 30, 1890.

Witnesses

Inventor
Croffard W. May
by James Sheehy
Attorney

UNITED STATES PATENT OFFICE.

CROFFARD WILLIAM MAY, OF VERDELLA, MISSOURI.

CHECK-ROW CORN-PLANTER.

SPECIFICATION forming part of Letters Patent No. 437,220, dated September 30, 1890.

Application filed December 2, 1889. Serial No. 332,356. (No model.)

*To all whom it may concern:*

Be it known that I, CROFFARD WILLIAM MAY, a citizen of the United States, residing at Verdella, in the county of Barton and State of Missouri, have invented certain new and useful Improvements in Check-Row Seed-Planters; and I do declare the following to be a full, clear, and exact description of the invention, such as will enable others skilled in the art to which it appertains to make and use the same.

In using check-row seed-planters in which the machine is drawn back and forth across the field it is necessary that some means be used to operate the seed-slide at such points that the hills will stand in rows across the field in two directions, that it may be cultivated in both ways.

My invention relates to an improvement in mechanism for operating the seed-slide; and it consists in an attachment that can be applied to any ordinary machine, by which it can be operated automatically or by hand, or the attachment can be removed and the machine be operated by hand, as will be hereinafter more particularly set forth.

Figure 1:
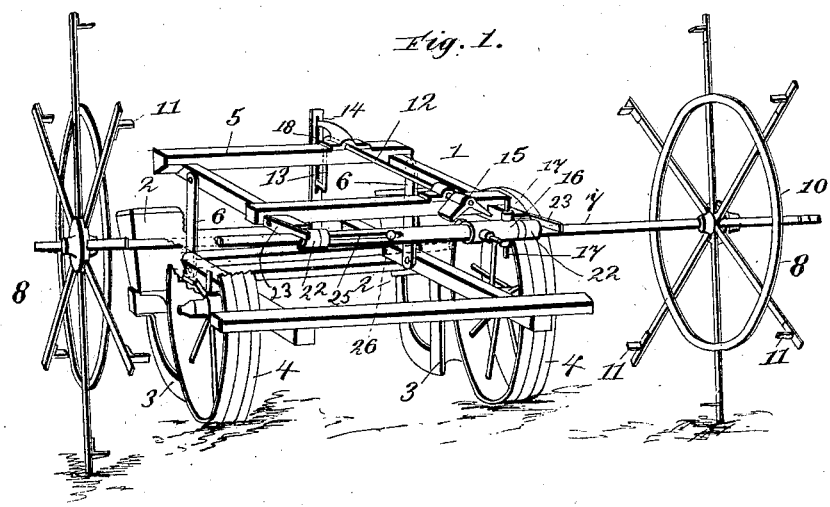
Figure 2:
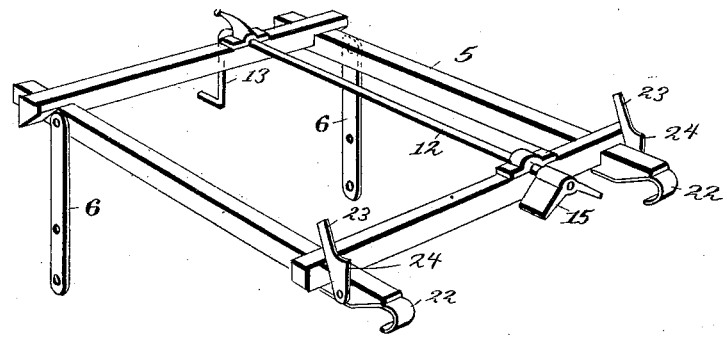
Figure 3:
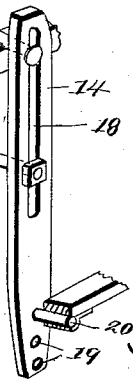

Referring to the drawings, Figure 1 is a rear perspective view of a seed-planter provided with my improved attachment. Fig. 2 is a similar view of the frame of my attachment detached, and Fig. 3 is a similar view of the means for connecting it with and operating the seed-slide.

1 indicates a seed-planter, which may be of any ordinary construction, having the seed-boxes 2, the sled-like furrow-openers 3, and the broad roller-wheels 4.

My attachment consists of a frame 5, which is pivotally secured to the frame of the planter at its front end in any convenient manner—as, for instance, by the arms 6—and is supported at its rear end upon the axle 7 and the wheels 8. The lower ends of the arms 6 are rigidly secured to the frame of the planter, and the frame 5 is pivotally secured to the upper ends of the arms, thereby permitting the machine to pass over rough or uneven ground, as the wheel that supports the rear end of the frame can rise and fall without affecting anything except the frame 5, and it can only swing it vertically on the pivots at the front.

The spokes of the wheels 8 project beyond the rim 10, and are provided with steps or projections 11 near their outer ends, which prevent the spokes from entering the ground too far, but do not prevent the spokes sinking in far enough to cause the wheels to always rotate at the same speed in passing across the field in either direction. The wheels are rigidly secured to the axle when passing across the field in one direction, so that a positive action will be given to the mechanism for operating the dropper-slide.

The mechanism I prefer to use for operating the seed-slide consists of a rock-shaft 12, journaled on the frame 5, the front end of which is provided with a crank 13, which engages with the lever 14, and its rear end is provided with a cross-head 15, having ends or arms inclined downwardly.

A sleeve or collar 16 on the axle is provided with radial lugs or projections 17, two of which stand at right angles to the other two, and are so arranged that they will engage with one arm of the cross-head 15 and the other two will engage with the other arm. In this manner, as the axle is rotated by the rotation of the wheels 8, the projections 17 will be made to alternately engage with the arms of the cross-head 15 and rock the shaft 12, and thus move the seed-slide in one direction or the other every time that a projection on the sleeve engages with one of the arms of the cross-head. When there are only four of these projections, this will happen every fourth of a revolution of the wheels 8; but I do not wish to limit myself to this particular number of projections, as it can be varied by changing the size of the wheel to cause the planter to travel the proper distances before the slide is operated.

The lever 14 for operating the seed-slide is preferably slotted, as at 18, so that it can be moved longitudinally and thus change the length of the throw of the end to which the slide is secured. The lower end of the lever is provided with a series of holes 19, in which is fitted a pin or bolt 20, which engages with the slide in any convenient manner. In this way the bolt can be made to engage with the slide when the lever is moved up or down upon its pivotal point. If desired, however, the lever 14 may be made to engage with the slide in the ordinary manner, or, rather, the crank 13 can be attached directly to the ordinary handle for operating the machine by hand, as by passing the pin through a hole in the handle.

As above described, my attachment can be readily applied to any ordinary planter, and as it is drawn back and forth across the field a hill of seed will be deposited every four feet or other desired distance apart, and, by causing the wheel to always start from a certain point at each end, the hills will register or make rows across the field at right angles to each other.

In order to cause the spokes of the wheels to register with the holes made by them in crossing the field in one direction, I prefer to detach the axle and wheels from the frame at the end of the row and then turn them around by hand and attach them to the planter, which has been turned around by the team and stationed at the beginning of a new row. In this manner the axle and one wheel can be swung around the wheel which stands between the last row and the new one by either having only one of the wheels rigidly secured to the axle or by providing the loose wheel with means whereby it can be loosened at the end and then be rigidly secured again to cross the field—as, for instance, by means of a set-screw—through the hub of the wheel. By making one of the spokes of the stationary wheel act as a pivot, and thus cause the wheel to start on its return from exactly the same point, the wheel is caused to rotate the same in the one direction that it did in the other, and consequently operate the seed-slide at the same points that they were operated in crossing the field in the opposite direction.

Although the wheels may be provided with any suitable number of spokes, I prefer to provide each one with eight spokes, so that the seed-slide will only be operated every second spoke.

The axle and wheels may be connected with the frame 5 by means of two hooks 22 upon the rear portion of the frame, so that they may be hooked over the axle, and can be removed by lifting up the frame. The points of the hooks are made to project slightly forward, so that the axle must be moved a trifle forward to pass the points of the hook in disengaging it from or connecting it with the frame.

Two latches 23 are pivotally secured to the frame 5 in such a position that when the hooks 22 have been placed over the axle a shoulder 24 upon the under side of the latch will engage with the axle and prevent its moving forward, and thus keep the hooks from becoming disengaged from the axle until the latches have been raised. The sleeve 16 is of such a length that the hooks 22 will just pass the ends of the sleeve, and thus prevent any lateral movement of the axle and wheels; but, if desired, a slot 25 may be made in the sleeve and a pin 26 passed through it into the axle, which will permit of the lateral movement of the frame and axle in relation to each other to the extent of the slot, as different machines may require that the frame be moved to one side or the other to cause the wheels to travel exactly between the rows or furrows.

Without limiting myself to the exact construction, I claim—

1. The combination, with a seed-planter, of a frame secured thereto, the rear end of which is provided with a hook and a latch on each side, a rock-shaft upon the frame for operating the seed-slide, a wheel-supported axle within the hooks, and means for operating the rock-shaft, substantially as specified.

2. The combination, with a seed-planter, of a frame pivotally secured thereto and having a hook and a latch secured to each side of its rear end, a rock-shaft on the frame, having a cross-head on its rear end, a wheeled supported axle within the hooks, a slotted sleeve upon the axle between the hooks, having projections for alternately engaging the opposite arms of the cross-head, and a pin through the slot into the axle, substantially as described.

CROFFARD WILLIAM MAY.

Witnesses:
H. E. FLETCHER,
JAXIN BROWN.